United States Patent [19]

Mogamiya

[11] Patent Number: 5,321,454
[45] Date of Patent: Jun. 14, 1994

[54] ZOOM LENS CAMERA

[75] Inventor: Makoto Mogamiya, Tokyo, Japan

[73] Assignee: Asahi Kogaku Kogyo Kabushiki Kaisha, Tokyo, Japan

[21] Appl. No.: 921,126

[22] Filed: Jul. 29, 1992

[30] Foreign Application Priority Data

Jul. 30, 1991 [JP] Japan .................. 3-214776

[51] Int. Cl.$^5$ .............. G03B 1/18; G03B 3/00
[52] U.S. Cl. ................ 354/195.12; 354/400
[58] Field of Search ......... 354/149.1, 195.1, 195.12, 354/222, 400

[56] References Cited

U.S. PATENT DOCUMENTS

| | | | |
|---|---|---|---|
| 4,847,647 | 7/1989 | Ueda | 354/149.1 |
| 4,914,461 | 4/1990 | Hori | 354/149.1 |
| 4,916,475 | 4/1990 | Hori | 354/419 |
| 4,936,664 | 6/1990 | Haraguchi et al. | 354/429 |
| 4,944,030 | 6/1990 | Haraguchi et al. | 354/403 |
| 4,945,372 | 7/1990 | Higuchi et al. | 354/197 |
| 4,951,074 | 8/1990 | Ueda | 354/149.1 |
| 4,965,615 | 10/1990 | Fujita et al. | 354/221 |
| 4,967,219 | 10/1990 | Morisawa et al. | 354/199 |
| 5,012,262 | 4/1991 | Mogamiya et al. | 354/149.1 |
| 5,037,187 | 8/1991 | Oda et al. | 354/195.12 |
| 5,068,678 | 11/1991 | Magamiya et al. | 354/199 |
| 5,083,146 | 1/1992 | Ueda | 354/149.1 |
| 5,122,822 | 6/1992 | Morisawa et al. | 354/195.1 |
| 5,153,626 | 10/1992 | Yamamoto | 354/187 |

FOREIGN PATENT DOCUMENTS 63-26643  2/1988  Japan .

OTHER PUBLICATIONS

English Langauge Abstract of Japanese Patent 63-26643.
French Search Report and Annex dated Dec. 18, 1992.
United Kingdom Search Report.

Primary Examiner—Michael L. Gellner
Attorney, Agent, or Firm—Sandler Greenblum & Bernstein

[57] ABSTRACT

A zoom lens camera including a zoom taking lens having at least one variable power lens group movable along an optical axis direction thereof, a device having a movable member separate from the zoom taking lens, a rotatable cam ring, at least one cam groove formed in the cam ring to move the movable variable power lens group in accordance with the rotation of the cam ring, and a cam member made separately from the cam ring and secured to the cam ring and having at least one cam groove for moving the movable member.

14 Claims, 4 Drawing Sheets

ZOOM LENS CAMERA

BACKGROUND OF THE INVENTION

1. Field of the Invention

The present invention relates to a zoom lens camera having a zoom taking lens and an optical member which is moved in association with the zooming operation of the zoom taking lens.

2. Description of Related Art

A known zoom taking lens of a zoom lens camera includes a cam ring which rotates about an optical axis to move variable power lens groups along the optical axis direction to effect a zooming operation. In such a zoom lens camera, other optical members, for example, a variable power lens of a finder optical system or an illuminating angle varying member of a strobe unit are moved in association with the zooming operation. To this end, the cam ring of the zoom taking lens is provided not only with a cam groove along which the variable power lens group of the zoom taking lens moves, but also cam grooves along which the variable power lens of the finder optical system or the illuminating angle varying member of the strobe unit moves.

However, there are drawbacks caused by the provision of the various cam grooves on the cam ring.

Namely, since the track of movement of the variable power lens group of the zoom taking lens is different from that of the variable power lens of the finder optical system or the illuminating angle varying member of the strobe unit, it is difficult to provide the corresponding cam grooves within a limited space of the cam ring. Furthermore, the locations of the various kinds of cam grooves are restricted, resulting in a decreased freedom of arrangement of the finder optical system or the strobe unit and a decrease in strength of the cam ring. In addition, the presence of the cam grooves makes it difficult to intercept light or optically isolate the cam ring of the zoom taking lens.

The primary object of the present invention is to provide a zoom lens camera in which a variable power lens group of a zoom taking lens as well as other optical members are moved by the rotation of a cam ring of the zoom taking lens, wherein the freedom of arrangement of the optical members is increased without decreasing the strength of the cam ring, and wherein light interception can be easily realized.

SUMMARY OF THE INVENTION

To achieve the object mentioned above, according to the present invention, there is provided a zoom lens camera comprising a zoom taking lens having at least one variable power lens group movable along the direction of an optical axis thereof, a device having a movable member separate from the zoom taking lens, a rotatable cam ring, at least one cam groove formed in the cam ring to move the movable variable power lens group in accordance with the rotation of the cam ring, and a cam member made separately from the cam ring and secured to the cam ring having at least one cam groove for moving the movable member.

According to another aspect of the present invention, there is provided a cam apparatus comprising a rotatable cam ring provided on an outer peripheral surface thereof with at least one cam groove, a first device having a movable member which is rotated by the rotation of the cam ring in accordance with the contour of the cam groove, a cam member made separately from the cam ring and secured to the cam ring and having at least one cam groove, and a second device having a movable member which is moved by the rotation of the cam ring in accordance with the contour of the cam groove.

According to still another aspect of the present invention, a zoom camera includes a taking lens having a zooming function, an engaging member projecting from the outer peripheral surface of the taking lens, a cam ring having a cam groove in which the engaging member is engaged and supporting the taking lens so as to move along the direction of the optical axis thereof, and an optical member made separately from the taking lens and movable along the optical axis direction of the taking lens in association with the zooming operation of the taking lens, wherein the improvement comprises a cover member mounted to the outer peripheral surface of the cam ring to cover the cam groove formed thereon, at least one cam groove formed on the outer surface of the cover member to move the optical member in the optical axis direction, and an engaging member formed on the peripheral surface of the optical member to be engaged in the cam groove of the cover member.

The present disclosure relates to subject matter contained in Japanese patent application No.3-214776 (filed on Jul. 30, 1991) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
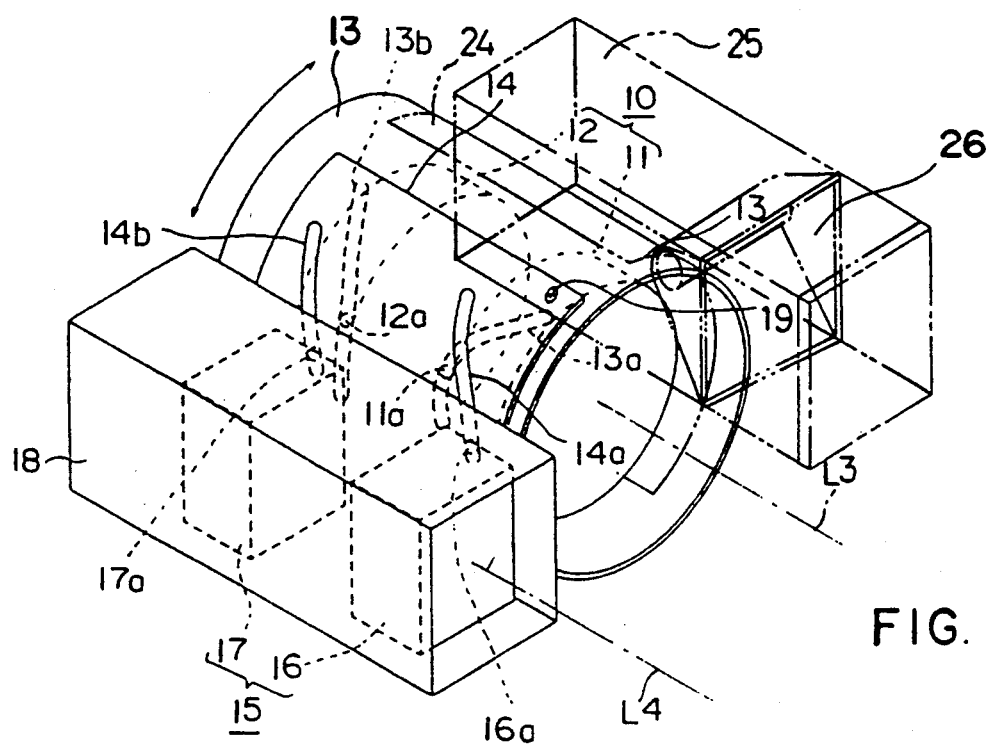
FIG. 1 is a perspective view of a zoom lens camera according to the present invention.

Front and rear variable power lens groups 11 and 12, which constitute a zoom taking lens 10, are provided inside a cam ring 13 and are moved along the optical axis direction L3 thereof by a linear movement guide mechanism which is known in the art. The cam ring 13 is provided on the outer peripheral surface thereof with cam grooves (holes) 13a and 13b extending therethrough. The cam ring 13 is rotatable about the optical axis L3.

The front and rear variable power lens groups 11 and 12 have engaging pins 11a and 12a integral therewith which project in the radial directions thereof and are fitted in the cam grooves 13a and 13b, respectively. Consequently, when the cam ring 13 is rotated about the optical axis L3, the front and rear variable power lens groups 11 and 12 are moved in the optical axis direction, while maintaining a predetermined relationship in accordance with the contour of the cam grooves 13a and 13b to effect the zooming operation.

Optical equipment 15 which has an optical axis L4 parallel with the optical axis L3 is located on one side of the zoom taking variable power lens 10 (cam ring 13). Optical equipment 15 is, for example, a zoom finder device or a zoom strobe device. In the illustrated embodiment, optical equipment 15 is a zoom finder device including a front variable power lens group 16 and a rear variable power lens group 17. Front and rear lens groups 16 and 17 are supported by a finder casing 18 to linearly move along the optical axis direction L4. Front and rear lens groups 16 and 17 are provided with engaging pins (engaging members) 16a and 17a projecting in the radial directions thereof, respectively.

Cam ring 13 is provided on the outer peripheral surface thereof with a cam member (cover member) 14 secured thereto by set screws 19. The cam member 14 defines a section of a circular cylinder having a curvature which corresponds to that of the cam ring 13. The cam member 14 has cam grooves 14a and 14b in which the engaging pins 16a and 17a of the movable variable power lens groups 16 and 17 respectively of the finder device 15 are engaged. The cam grooves 14a and 14b are in the form of closed bottomed recesses.

Figure 4:
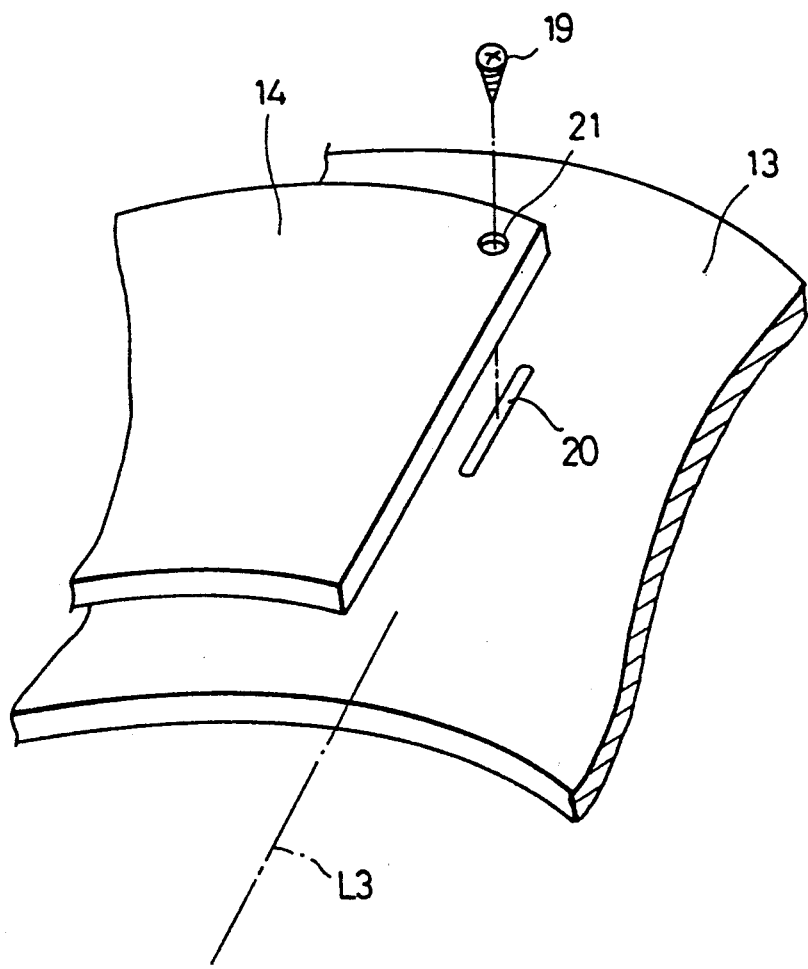
FIG. 4 is a plan view of a main part of a position adjusting member provided between a cam ring and a cam member of a zoom lens camera shown in FIG. 1.
Figure 5:
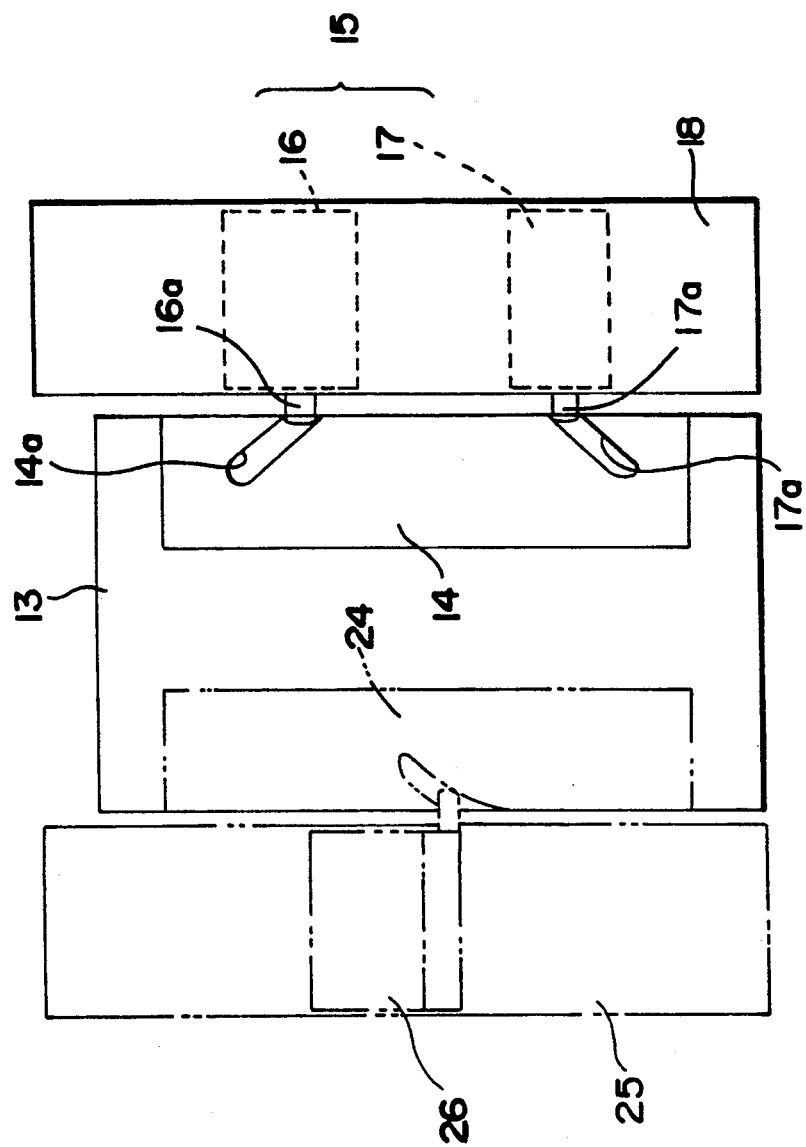
FIG. 5 is a plan view of the camera illustrated in FIG. 1.

Between the cam member 14 and the cam ring 13 is provided a position adjusting means for adjusting the axial position of the cam member 14 relative to the cam ring 13, as shown in FIG. 4. The position adjusting means includes elongated tapping holes (or grooves) 20 provided on the cam ring 13. The tapping holes extend in parallel with the optical axis L3 and can be threaded by the set screws 19 when the latter are inserted in the corresponding tapping holes 20. The position adjusting means further includes corresponding insertion holes 21 formed in the cam member 14 in which the associated set screws 19 are inserted. After the axial position of the cam member 14 with respect to the cam ring 13 is adjusted, the set screws 19 are inserted into the corresponding insertion holes 21 and then screwed into the corresponding tapping holes 20 to firmly fix the cam member 14 at the adjusted axial position.

Thus, the position of the cam member 14 relative to the cam ring 13 along the optical axis direction is adjusted before the cam member 14 is secured to the cam ring 13, so that the photographic range (angle of view) of the zoom taking lens 10 can be easily made coincident with the field of view of the zoom finder device 15. Alternatively, it is possible to provide elongated holes (corresponding to the elongated holes 20) extending along the optical axis direction and threaded holes (corresponding to the insertion holes 21) on the cam member 14 and the cam ring 13, respectively.

Figure 2:
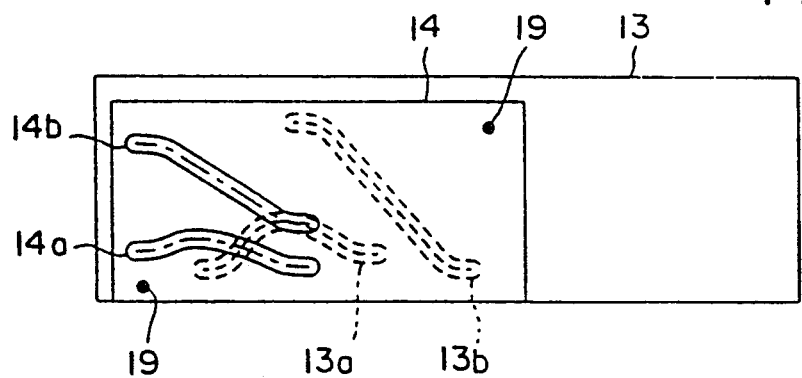
FIG. 2 is a developed view of a cam ring and a cam member secured thereto in a zoom lens camera shown in FIG. 1.
Figure 3:
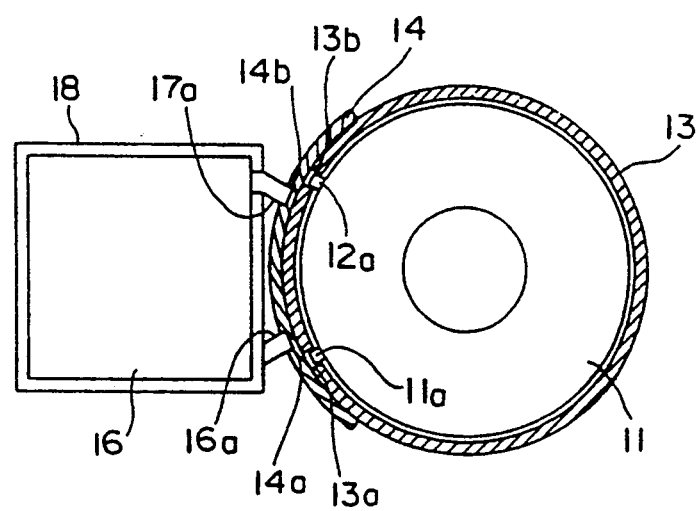
FIG. 3 is a front elevational view of a zoom lens camera shown in FIG. 1.

The size and shape of the cam member 14 are such that when the cam member 14 is secured on the outer peripheral surface of the cam ring 13, the cam grooves 13a and 13b of the cam ring 13 are covered by the cam member 14. The cam grooves 13a and 13b of the cam ring 13 partially overlap the cam grooves 14a and 14b of the cam member 14, in a plan view, as can be seen in FIG. 2. Since the cam member 14 is made separately from the cam ring 13 and can be integrally secured thereto, it is possible to provide different partially overlapping cam grooves on the cam ring assembly of the cam member 14 and the cam ring 13, resulting in increased freedom of location of the finder device 15 and enhanced strength of the cam ring 13. Furthermore, since the cam grooves 13a and 13b of the cam ring 13 are covered by the cam member 14, the cam ring 13 can effectively intercept light without providing an additional light intercepting member.

The zoom lens camera as constructed above operates as follows.

When the cam ring 13 is rotated, the variable power lens groups 11 and 12 of the zoom taking lens 10 are moved in the optical axis direction L3 in accordance with the contours of the cam grooves 13a and 13b to carry out the zooming operation. At the same time, the variable power lens groups 16 and 17 of the finder device 15 are moved along the optical axis direction L4 in accordance with the contours of the cam grooves 14a and 14b of the cam member 14 secured to the cam ring 13 to carry out the zooming operation of the finder.

The finder device 15 in the illustrated embodiment can be replaced with a strobe device. In such an alternative, for example, the movable members 16 and 17 correspond to a condenser lens and an assembly of the strobe light emitting tube and reflecting shade, respectively. The contours of the cam grooves 14a and 14b are appropriately modified for the strobe device, so that the angle of view of the zoom taking lens 10 can be made coincident with the illumination angle of the strobe device.

In the case of a zoom strobe device, generally speaking, the condenser lens is immovable. Accordingly, the cam groove 14a of the cam member 14 is unnecessary.

It is possible to provide the zoom strobe device 25 on the opposite side of the zoom finder device 15 with respect to the zoom taking lens 10, as shown by imaginary lines in FIG. 1. In this alternative, an additional cam member 24, separate from the cam member 14 and having cam grooves for the zoom strobe device 25, is secured to the cam ring 13 to drive the illumination angle varying member 26 of the zoom strobe device 25.

I claim:

1. A zoom lens camera comprising:
    a zoom taking lens having at least one variable power lens group movable along an optical axis direction thereof;
    a device having a movable member, separate from the zoom taking lens;
    a rotatable cam ring;
    at least one cam groove formed in the cam ring to move the movable variable power lens group in accordance with the rotation of the cam ring;
    a cam member made separately from the cam ring having at least one cam groove for moving the movable member, wherein said cam member is secured to the cam ring; and
    said cam member being secured to the cam ring to completely cover the cam groove formed in the cam ring, said cam groove of the cam member being a closed bottomed groove.

2. A zoom lens camera according to claim 1, wherein said device having the movable member is a zoom finder optical system.

3. A zoom lens camera according to claim 2, wherein said movable member is a movable variable power lens group.

4. A zoom lens camera according to claim 1, wherein said device having the movable member is a strobe device.

5. A zoom lens camera according to claim 4, wherein said movable member is an illumination angle varying member.

6. A zoom lens camera according to claim 1, wherein said cam ring is rotatable about an axis coincident with the optical axis of the zoom taking lens.

7. A zoom lens camera according to claim 6, wherein said cam member is formed as a cylinder section having an inside surface curvature corresponding to an outside surface curvature of the cam ring.

8. A zoom lens camera according to claim 1, wherein said cam member is shaped to conform to the cam ring so that the cam groove of the cam ring is completely covered.

9. A zoom lens camera according to claim 7, further comprising a position adjusting means between the cam ring and the cam member for adjusting the axial position of the cam member.

10. A zoom lens camera according to claim 9, wherein said position adjusting means comprises at least one elongated hole extending along an optical axis direction and formed in one of the cam ring or the cam member, and a corresponding insertion hole formed in the other of the cam member or the cam ring, respectively.

11. A zoom lens camera according to claim 10, wherein said position adjusting means comprises a set screw inserted in the elongated hole and the insertion hole to secure the cam member to the cam ring.

12. A cam apparatus comprising:
a rotatable cam ring provided on a peripheral surface thereof with at least one cam groove;
a first device having a movable member which is driven by the rotation of the cam ring in accordance with the contour of the cam groove
a cam member made separately from the cam ring having at least one cam groove, wherein said cam member is secured to the cam ring, said cam member completely covering the cam groove formed in the cam ring, said at least one cam groove of the cam member being a closed bottom groove; and
a second device having a movable member which is moved by the rotation of the cam ring in accordance with the contour of the cam groove of the cam member.

13. A zoom camera including a taking lens having a zooming function, an engaging member projecting from the outer peripheral surface of the taking lens, a cam ring having a cam groove in which the engaging member is engaged and supporting the taking lens so as to move along a direction of the optical axis thereof, and an optical member made separately from the taking lens and movable along the optical axis direction of the taking lens in association with the zooming operation of the taking lens, said zoom camera comprising:
a cover member mounted to the outer peripheral surface of the cam ring to completely cover the cam groove formed thereon, at least one cam groove formed on the outer surface of the cover member to move the optical member along the optical axis direction, said cam groove of the cover member being closed bottomed so as not to extend through the cover member, and an engaging member formed on the peripheral surface of the optical member to be engaged in the cam groove of the cover member.

14. A zoom camera according to claim 13, further comprising a position adjusting means for adjusting the axial position of the cover member relative to the cam ring.

* * * * *